July 27, 1965 C. S. FARNETH 3,196,463
ANKLE JOINT FOR ARTIFICIAL LIMB
Filed May 23, 1962 2 Sheets-Sheet 1

Clayton S. Farneth
INVENTOR.

BY *Clarence A. O'Brien*
*and Harvey B. Jacobson*
Attorneys

July 27, 1965   C. S. FARNETH   3,196,463
ANKLE JOINT FOR ARTIFICIAL LIMB
Filed May 23, 1962   2 Sheets-Sheet 2
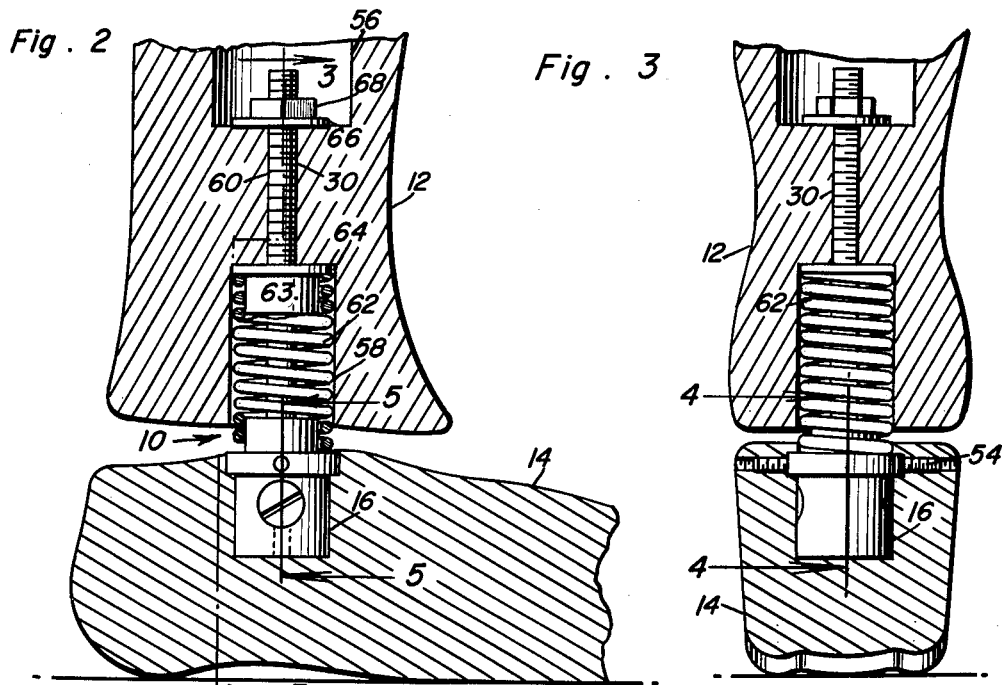
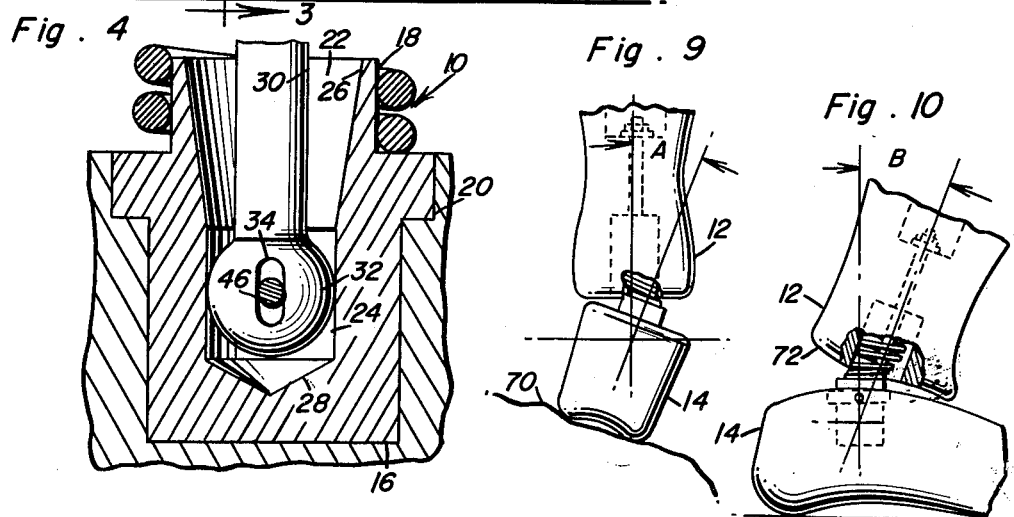
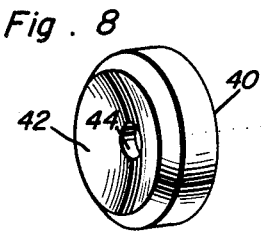
Clayton S. Farneth
INVENTOR.
BY *Clarence A. O'Brien*
and *Harvey B. Jackson*
Attorneys United States Patent Office 3,196,463
Patented July 27, 1965

3,196,463
ANKLE JOINT FOR ARTIFICIAL LIMB
Clayton S. Farneth, Beaver, Pa.
(R.D. 2, Box 490–A, New Kensington, Pa.)
Filed May 23, 1962, Ser. No. 196,976
5 Claims. (Cl. 3—32)

This invention relates to flexible coupling devices, and particularly to improved flexible resilient couplings for connecting an artificial foot to an artificial leg.

Accordingly, it is the primary object of the invention to provide an improved coupling between an artificial foot and an artificial leg so that in use it functions in the same manner as a human ankle.

It is another object of the invention to provide a resilient coupling for connecting an artificial foot to an artificial leg so that the coupling normally maintains a natural relative position between the foot and leg and yet permits the foot to move within limits in any direction relative to the leg. Thus, the resilient coupling functions as a universal joint.

It is another object of the invention to provide a resilient coupling for connecting artificial body members but permits the members to move in any direction relative to one another and tends to return the members to a natural or normal position.

It is another object of the invention to provide an improved flexible coupling that serves as an artificial ankle for connecting an artificial leg and an artificial foot and is provided with improved means for connecting the coupling to the leg and the foot.

It is a further object of the invention to provide a flexible ankle joint that is provided with adjustable means for selectively regulating the effective stiffness of the joint.

It is still another object of the invention to provide an artificial ankle joint that is so designed that it automatically is protected from contamination by any water or liquid running down the artificial leg to which the joint is connected.

It is yet another object of the invention to provide an artificial ankle joint which is economical to manufacture, durable in use and requires a minimum of maintenance and adjustment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical cross-sectional view through the ankle joint and portions of the foot and leg shown in FIGURE 1;

FIGURE 3 is a vertical cross-sectional view taken substantially on the plane of line 3—3 in FIGURE 2.

FIGURE 4 is an enlarged vertical cross-sectional view taken substantially on the plane of line 4—4 in FIGURE 3;

FIGURE 8 is an enlarged perspective view of a detail;

FIGURES 9 and 10 are diagrammatic views illustrating how the ankle joint flexes to permit the foot and leg to move to various relative positions.

Figure 1:
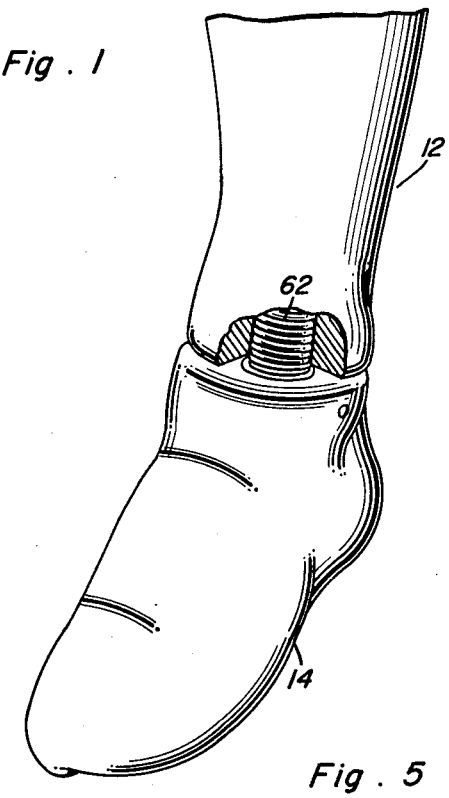
FIGURE 1 is a perspective view with parts broken away illustrating how the ankle joint connects an artificial leg to an artificial foot.
Figure 6:
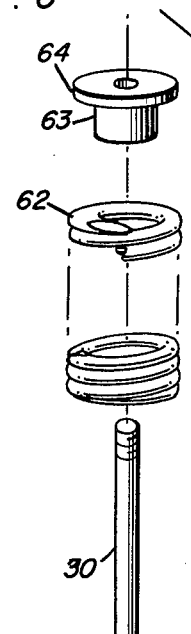
FIGURE 6 is an exploded perspective view of a portion of the ankle joint.

As shown in the drawings, the ankle joint or resilient coupling 10 connects the lower end of an artificial leg 12 to the upper portion of an artificial foot 14.

The ankle joint 10 comprises a cylindrical base, body or housing, 16 having a cylindrical reduced upper extension or sleeve-like portion 18 connected to the base 16 by means of an integral, circular and radially outwardly projecting annular flange 20. The base 16 is provided with a chamber 22 defined by a lower circular wall 24 concentric with an upwardly divergent frusto-conical wall 26. The bottom of the chamber 22 may terminate in a conical portion 28.

A connecting rod or joint member 30 provided with a spherical member or ball 32 on its lower end extends into the chamber 22 so that the ball 32 is contained entirely within the cylindrical wall 24. The ball 32 is formed with two frusto-conical coaxial and outwardly divergent recesses 34 extending radially inwardly from opposite sides of the ball so that the apices of the recesses intersect at the center of the ball and define opposing pivot points 36.

A bore 38 is formed diametrically through the center of the base 16 and the cylindrical wall 24. A pair of discs 40 are provided in the bore 38 and each disc has a part spherical recess 42 of the same radius as the ball 32 formed in one end thereof and a bore 44 formed through the center thereof.

Figure 5:
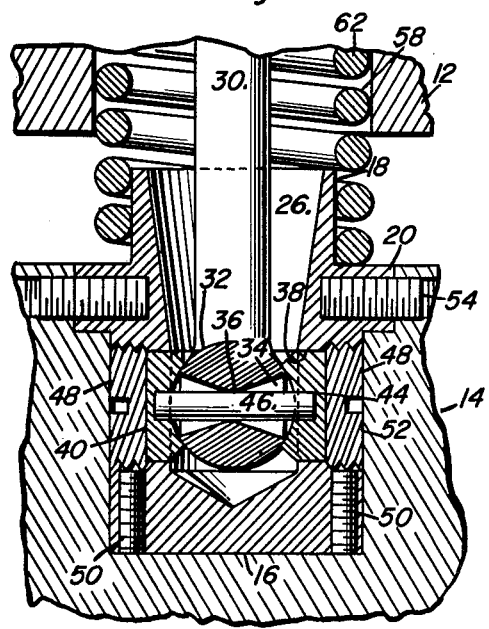
FIGURE 5 is an enlarged vertical cross-sectional view taken at right angles to FIGURE 4 and substantially on the plane of line 5—5 in FIGURE 2.

After the ball 32 has been inserted within the chamber 22, it is rotated so that the centers of the recesses 34 are coaxial with the bore 38. A cylindrical pin 46 is then inserted through one end of bore 38 into the recesses 34 as shown in FIGURE 5. Pin 46 has the same diameter as the maximum spacing between the points 36 and the diameter of the bore 44. The discs 40 are then inserted in opposite ends of the bore 38 so that the recesses 42 thereof engage opposite sides of the ball 32 and the pin 46 extends into the bores or recesses 44. At least the outer ends of the bore 38 is provided with threads so that circular plugs 48 having peripheral threads may be threaded into the outer ends of the bore 38 so as to force the discs 40 tightly against opposite ends of the pin 46 as shown in FIGURE 5. When the plugs 48 are tightly screwed into the bore 38, the recesses 42 of the discs 40 snugly fit the outer periphery of the ball 32 but yet permit the ball to rotate freely in the recesses.

A pair of setscrews 50 are threaded into opposite ends of the base 16 so as to engage the plugs 48 and lock them securely in position. If desired, these studs 50 may extend through apertures in the bottom of the foot 14 so as to secure the base 16 to the foot in addition to locking the plugs 48 in position. Also, if desired, the pin 46 may be shorter than illustrated in FIGURE 5 since the plugs 48 may be locked by the setscrews or studs 50.

Figure 7:
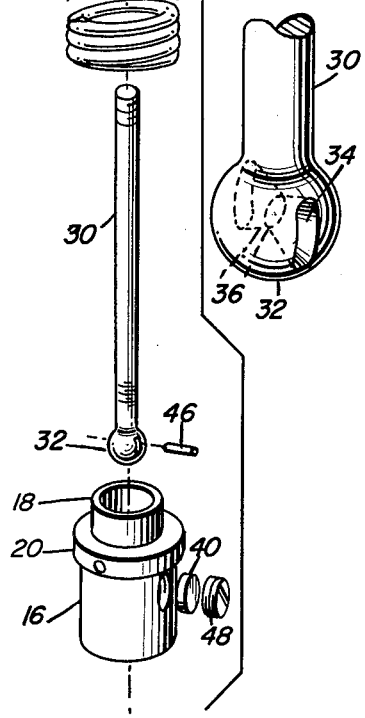
FIGURE 7 is an enlarged perspective view of a portion of the ball socket joint of the ankle joint.

As can be seen in FIGURE 7, the upper and lower surfaces of the recesses 34 are semi-circular so that a circular line of contact is maintained between the center of the ball 32 and the pin 46.

The foot 14 is provided with a circular recess 52 for snugly receiving the cylindrical body 16 and flange 20. Diametrically aligned bores are provided in opposite sides of flange 20 and foot 14 for receiving setscrews or studs 54 which extend through the foot and are threaded into the bores in flange 20 for securing the body 16 to the foot.

The leg 12 contains a hollow chamber 56 in its upper portion and a cylindrical recess 58 in its lower end in alignment with the chamber 56. A bore 60 concentric with the recess 58 connects the reces to the chamber 56.

The central and upper portions of the connecting rod 30 are threaded and a coil spring 62 encircles the central portion of the rod, surrounds the cylindrical extension 18 and rests on the upper surface of flange 20. A nut 63 having a circular flange 64 integral therewith is threaded on the rod 30 and extends into the spring 62 so that the flange 64 may abut the upper end of the spring and compress the spring between the flanges 64 and 20.

The leg 12 is then inserted on the rod 30 so that the flange 64 abuts against the upper end of the recess 58. A lock washer 66 is then placed over the upper end of the rod within the chamber 56 and a nut 68 is threaded on the upper end of the rod so as to compress the portion of the leg 12 between chamber 56 and recess 58 between the washer 66 and flange 64.

In operation, the spring 62 since it has ends parallel to one another and perpendicular to its axis maintains the foot 14 generally perpendicular to the leg 12 as illustrated in FIGURE 2. However, when the ankle joint is used for walking on tilted surfaces such as 70 in FIGURE 9, the spring will flex through the angle A thereby permitting the bottom of the foot to be fully supported on the surface 70. Of course, the angle of sideways tilting of the foot 14 is limited to substantially 30° from a neutral position by the contacting of the pin 46 with the upper and lower surfaces of the frusto-conical recesses 34 in the ball 32 and by contact between rod 30 and wall 26.

When the artificial limb assembly illustrated in the drawings is used for walking, the foot 14 is permitted to pivot in the natural manner relative to the leg 12 as illustrated in FIGURE 10 since the circular surface or line defined at the center of the ball 32 by the recesses 34 merely rotates about the central portion of the periphery of the pin 46. Of course, the degrees of forward and rearward pivoting of foot 14 or its leg 12 as illustrated in FIGURE 10 may be limited by the bottom surfaces 72 of leg 12 contacting the upper surfaces of foot 14. Of course, the compression of the spring 62 during the tilting operation also tends to limit the amount of pivot between the leg and the foot. However, the amount of relative pivoting between the leg 12 and foot 14 will normally be limited by the lower portion of the rod 30 contacting the frusto-conical walls 26 of the base member 16. The spring 62 always returns the foot to the normal position relative to the leg 12 as illustrated in FIGURE 2. The resistance which the spring 62 exerts in opposition to any tilting force may be regulated by adjusting the position of the nut 63 on rod 30 which in turn regulates the amount of compression in the spring. Normally, the maximum angle of pivot permitted between the leg and foot from a neutral position are illustrated in FIGURES 9 and 10 by the angles A and B. The maximum angles A and B are determined by the sides of the lower end of rod 30 abutting the surfaces of the frusto-conical wall 26. When the rod contacts the wall 26, there is line contact therebetween which affords a relatively large bearing surface for limiting movement of the rod.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An artificial limb including artificial leg and foot members and an ankle joint connecting said members for limited flexibility in each of two vertical planes extending respectively longitudinally and transversely of a foot member, a body with a vertically extending chamber therein, said body being mounted in and fixedly secured to one of said members, a vertically extending rod having one end disposed in and secured to the other of said members and having on its other end a ball secured within and disposed for journaled movement in said chamber, said ball having a passage therethrough with a substantially horizontal axis lying in said transverse vertical plane, an ankle pivot pin carried by said body and extending transversely thereof and through said passage and securing said body and the associated member to said rod, said passage having its mid-portion journaled on said pin and having its opposite end portions of progressively increasing vertical extent from said mid-portion toward its ends providing clearance and limiting the tilting of said body and the associated member about a substantially horizontal axis in said longitudinal vertical plane, said chamber having upwardly divergent inner surfaces engageable by said rod and limiting inclination of said body and its associated member relative to the vertical axis of said rod, said body having therethrough a transverse bore intersecting said chamber and coaxial with said passage horizontal axis, a pair of plugs each movably received in and being removable through an opposite end of said transverse bore and having a bearing surface engaging said ball, said plugs journaling and retaining said ball therebetween and retaining said pivot pin in said passage, a closure means removably received each in an outer end of said transverse bore and each engaging and releasably retaining one of said plugs in said transverse bore.

2. The combination of claim 1 including resilient means surrounding said rod and having portions operatively connected to said body and to said other member and yieldingly urging them along the axis of said rod to a predetermined relative position.

3. The combination of claim 2 wherein said body has an exterior laterally projecting mounting flange, fastening means engaging said mounting flange and said one member and detachably securing them together, said body having an upwardly extending sleeve-like portion in which is disposed said divergent inner surfaces, said resilient means abutting said mounting flange and embracing said sleeve-like portion.

4. The combination of claim 1 wherein said plugs have aligned recesses in their adjacent faces which recesses receive and retain the adjacent ends of said pivot pin.

5. The combination of claim 1 wherein said passage has parallel planar side walls with which said pivot pin is slidably and guidingly engaged and which side walls prevent relative lateral movement of said pin in said passage while said vertical clearance between said pin and passage allows but positively limits relative vertical movement.

References Cited by the Examiner
UNITED STATES PATENTS

| | | | |
|---|---|---|---|
| 42,799 | 5/64 | Shepard | 3—32 X |
| 288,239 | 11/83 | Ingram | 3—32 |
| 630,630 | 8/99 | Rice | 3—32 |
| 995,817 | 6/11 | Vanorman | 3—32 |
| 2,726,105 | 12/55 | Koenig | 287—88 |
| 2,877,032 | 3/59 | Fidler | 287—90 |

RICHARD A. GAUDET, *Primary Examiner.*